(12) United States Patent
Sun et al.

(10) Patent No.: US 8,736,236 B2
(45) Date of Patent: May 27, 2014

(54) MASTER-SLAVE INTERLEAVED BCM PFC CONTROLLER AND CONTROL METHOD THEREOF

(75) Inventors: Liangwei Sun, Hangzhou (CN); Qiukai Huang, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 54 days.

(21) Appl. No.: 13/593,681

(22) Filed: Aug. 24, 2012

(65) Prior Publication Data

US 2013/0063180 A1    Mar. 14, 2013

(30) Foreign Application Priority Data

Sep. 13, 2011    (CN) .......................... 2011 1 0269418

(51) Int. Cl.
*G05F 5/00*    (2006.01)
(52) U.S. Cl.
USPC ............... 323/207; 323/222; 363/65; 363/89; 363/90
(58) Field of Classification Search
USPC ........ 323/205, 206, 207, 222; 363/84, 89, 90, 363/65
See application file for complete search history.

(56) References Cited

U.S. PATENT DOCUMENTS

| | | | |
|---|---|---|---|
| 7,116,087 B2* | 10/2006 | Zhang et al. .................. | 323/272 |
| 8,098,505 B1* | 1/2012 | Choi ............................... | 363/89 |
| 8,120,340 B2* | 2/2012 | Chen et al. .................... | 323/272 |
| 2008/0252275 A1* | 10/2008 | Martin .......................... | 323/282 |
| 2009/0257257 A1* | 10/2009 | Adragna et al. ............... | 363/65 |
| 2010/0097041 A1* | 4/2010 | Ayukawa et al. .............. | 323/272 |
| 2011/0199797 A1* | 8/2011 | Bridge et al. .................. | 363/65 |

* cited by examiner

*Primary Examiner* — Nguyen Tran
(74) *Attorney, Agent, or Firm* — Michael C. Stephens, Jr.

(57) ABSTRACT

The present invention relates to a master-slave interleaved BCM PFC controller for controlling a PFC circuit with master and slave channels. In one embodiment, the PFC controller can include: a master channel controller that generates a master channel control signal and an inverted master channel control signal; a first phase shifter that provides a first phase shift for the master channel control signal, and generates a delayed opening signal therefrom; a second phase shifter that provides a second phase shift for the inverted master channel control signal, and generates a delayed shutdown signal therefrom; a slave channel controller that receives the delayed opening signal, the delayed shutdown signal, and a slave channel inductor current zero-crossing signal, and generates a slave channel control signal therefrom.

16 Claims, 11 Drawing Sheets

MASTER-SLAVE INTERLEAVED BCM PFC CONTROLLER AND CONTROL METHOD THEREOF

RELATED APPLICATIONS

This application claims the benefit of Chinese Patent Application No. 201110269418.9, filed on Sep. 13, 2011, which is incorporated herein by reference in its entirety.

FIELD OF THE INVENTION

The present invention relates to the field of power factor correction (PFC), and more specifically to a master-slave interleaved boundary conduction mode (BCM) PFC controller, and a control method thereof.

BACKGROUND

With the development of power electronics, various power electronics devices have been widely used in power system, industry, transportation, and household equipment. However, current harmonics and reactive power generated during application of power electronics devices can harm to the power grid. To overcome this problem, PFC circuits are generally applied in power electronics devices, such as in rectifiers or other switching power supplies, in order to keep the input current substantially in phase with the input voltage, thus lowering the harmonics and improving the power factor.

SUMMARY

In one embodiment, a master-slave interleaved boundary conduction mode (BCM) power factor correction (PFC) controller for controlling a PFC circuit with master and slave channels, can include: (i) a master channel controller configured to generate a master channel control signal and an inverted master channel control signal; (ii) a first phase shifter configured to provide a first phase shift for the master channel control signal, and to generate a delayed opening signal therefrom; (iii) a second phase shifter configured to provide a second phase shift for the inverted master channel control signal, and to generate a delayed shutdown signal therefrom; (iv) a slave channel controller configured to receive the delayed opening signal, the delayed shutdown signal, and a slave channel inductor current zero-crossing signal, and to generate a slave channel control signal therefrom; (v) where the slave channel control signal and the slave channel are configured to be activated when the delayed opening signal and the slave channel inductor current zero-crossing signal are both active; and (vi) where the slave channel control signal and the slave channel are configured to be deactivated when the delayed shutdown signal is active.

In one embodiment, a method of operating a master-slave interleaved BCM PFC controller for a PFC circuit, can include: (i) generating a first phase shift for a master channel control signal; (ii) detecting a slave channel inductor current; (iii) activating a slave channel when a master channel opening signal is delayed by the first phase shift and the slave channel inductor current reaches zero; (iv) generating a second phase shift for an inverted master channel control signal; and (v) deactivating the slave channel when the inverted master channel control signal is delayed by the second phase shift.

Embodiments of the present invention can advantageously provide several advantages over conventional approaches. For example, the PFC controller can be maintained to operate in a BCM state, and may also recover to a stable state quickly, even in a dynamic process or when affected by interference factors. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to actively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. For example, the power factor correction (PFC) controller can be maintained to operate in a boundary conduction mode (BCM) state, and may also recover to a stable state quickly, even in a dynamic process or when affected by interference factors. The invention, in its various aspects, may be explained in greater detail below with regard to exemplary embodiments.

Figure 1:
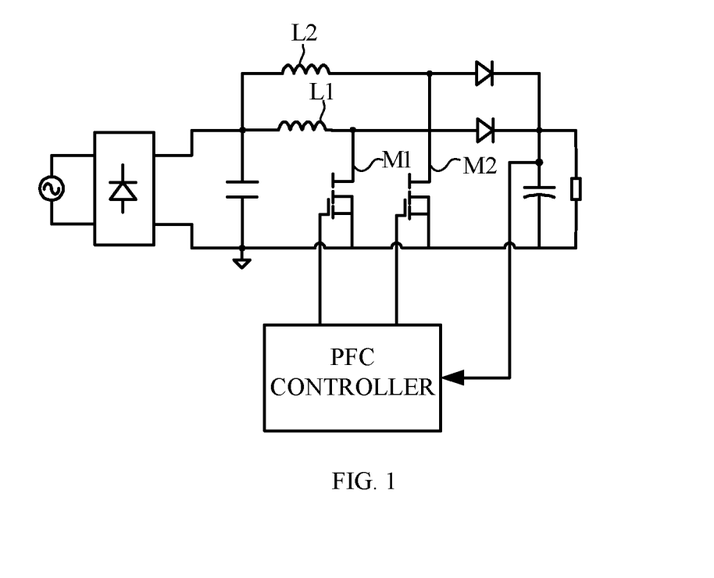
FIG. 1 is a block schematic diagram of an example master-slave interleaved BCM PFC circuit.

In one example master-slave interleaved BCM PFC circuit, a high power factor may be achieved by controlling the switches of the PFC circuit in accordance with a pulse width modulation (PWM) signal. The PWM signal may be generated by a master-slave interleaved BCM PFC controller. FIG. 1 shows an example of such a master-slave interleaved BCM PFC circuit. In this example, the power stage can include a master channel and a slave channel. The master channel can include first switch M1 and first inductor L1, and the slave channel can include second switch M2 and second inductor L2. Second switch M2 may be controlled simultaneously in accordance with the first switch M1 by the PFC controller so as to achieve master-slave control for the PFC circuit, reduce the harmonics, and increase the power factor.

Figure 2:
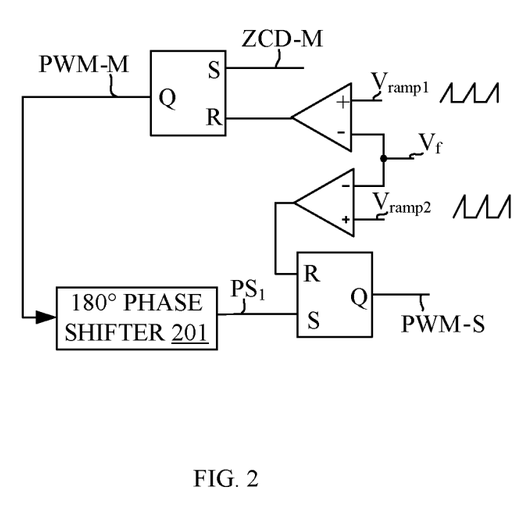
FIG. 2 is a block schematic diagram of an example master-slave interleaved BCM PFC controller.

FIG. 2 is a block schematic diagram of the example PFC controller shown in FIG. 1. In this example, the PFC controller can include a master channel controller for controlling the first switch, and a slave channel controller for controlling the second switch. When the first switch is turned on by master channel control signal PWM-M, which can be generated by master channel controller, a 180° phase shifter 201 can receive master channel control signal PWM-M and may provide a 180° phase shift for PWM-M to generate a slave channel control signal PWM-S.

The slave channel controller can receive slave channel control signal PWM-S, and may activate the second switch when slave channel control signal PWM-S is active. On the other hand, when the slave channel controller receives an active slave channel shutdown signal, the second switch may be deactivated by the slave channel controller. For example, when the PFC controller operates in a voltage control mode, the second switch may be turned off by the slave channel controller when a second ramp signal $V_{ramp2}$ reaches a feedback signal $V_f$ of the output voltage of the PFC circuit.

However, when the 180° phase shifter cannot provide a precise 180° phase shift for master channel control signal PWM-M (e.g., because of interference factors in the PFC controller), various problems can occur. For example, the second inductor current of the slave channel may have already reached zero before the phase shift for PWM-M can reach 180°. The second switch may be activated only when the phase shift reaches 180°, thus the slave channel in this case may function in a discontinuous current mode (DCM) state. If the second inductor current of the slave channel reaches zero after the phase shift for PWM-M has already reached to 180°, the second switch may be activated before the second inductor current reaches zero, and the slave channel in this case may be working in a continuous current mode (CCM) state. In either of these cases, the slave channel may not be maintained in a BCM state, and may even do harm to the stability of the PFC circuit.

In view of the above-mentioned, particular embodiments can provide a master-slave interleaved BCM PFC controller and a control method thereof. In particular embodiments, the master channel control signal and the inverted master channel control signal may be separately delayed with a predetermined phase shift, and at substantially the same time an inductor current zero-crossing signal of the slave channel controller may be detected. The slave channel may be turned on or activated when the phase shift reaches the predetermined phase shift, and the inductor current reaches zero. In this way, the PFC controller can be maintained to operate in a BCM state, and may also recover to a stable state quickly, even in a dynamic process or when affected by interference factors.

A PFC controller in particular embodiments can include a master channel controller, a first phase shifter, a second phase shifter, and a slave channel controller. The first phase shifter may be used to generate a delayed opening signal with a predetermined phase shift. When both of the delayed opening signal and the slave channel inductor current zero-crossing signal are active, the slave channel may be turned on or activated. When the slave channel shutdown signal is active, the slave channel may be turned off or deactivated. Also, the PFC circuit of particular embodiments can recover to a master-slave interleaved BCM state relatively quickly when affected by interference factors. In addition, both voltage control and current control modes may be supported for a master-slave interleaved BCM PFC controller in particular embodiments.

In one embodiment, a master-slave interleaved BCM PFC controller for controlling a PFC circuit with master and slave channels, can include: (i) a master channel controller configured to generate a master channel control signal and an inverted master channel control signal; (ii) a first phase shifter configured to provide a first phase shift for the master channel control signal, and to generate a delayed opening signal therefrom; (iii) a second phase shifter configured to provide a second phase shift for the inverted master channel control signal, and to generate a delayed shutdown signal therefrom; (iv) a slave channel controller configured to receive the delayed opening signal, the delayed shutdown signal, and a slave channel inductor current zero-crossing signal, and to generate a slave channel control signal therefrom; (v) where the slave channel control signal and the slave channel are configured to be activated when the delayed opening signal and the slave channel inductor current zero-crossing signal are both active; and (vi) where the slave channel control signal and the slave channel are configured to be deactivated when the delayed shutdown signal is active.

Figure 3:
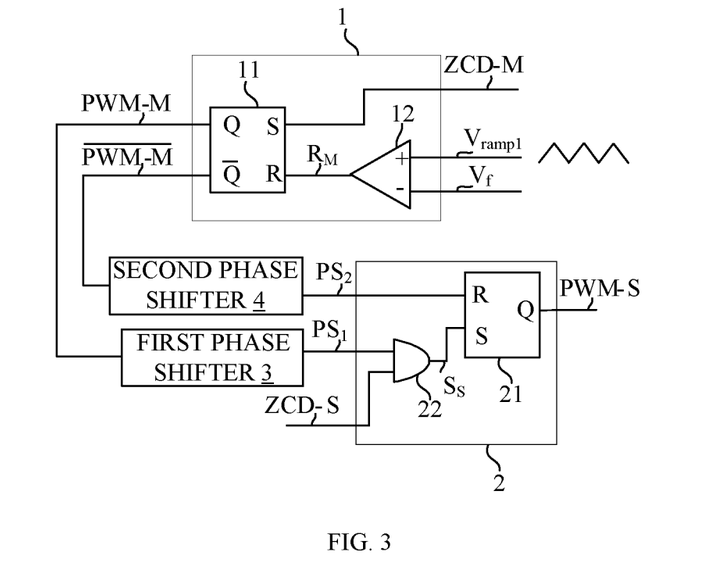
FIG. 3 is a block schematic diagram of a first example master-slave interleaved BCM PFC controller operable in a voltage control mode, in accordance with embodiments of the present invention.

With reference to FIG. 3, shown is a block schematic diagram of a first example master-slave interleaved BCM PFC controller that uses voltage control mode, in accordance with a first embodiment of the present invention. This example master-slave interleaved BCM PFC controller can include master channel controller 1, slave channel controller 2, first phase shifter 3, second phase shifter 4, first phase shifter 3, and second phase shifter 4. Phase shifters 3 and 4 may be coupled between master channel controller 1 and slave channel controller 2.

Master channel controller 1 can include first RS flip-flop 11 and first comparator 12. First comparator 12 can receive first ramp signal $V_{ramp1}$ at its non-inverting terminal, and feedback signal $V_f$ of an output voltage of the PFC circuit at its inverting terminal. First comparator 12 may generate master channel shutdown signal $R_M$, which can be provided today reset terminal of the first RS flip-flop 11 as shown. First RS flip-flop 11 can receive master channel inductor current zero-crossing signal ZCD-M at its set terminal, and the master channel shutdown signal $R_M$ at its reset terminal. First RS flip-flop 11 may generate master channel control signal PWM-M at output terminal Q, and inverted master channel control signal $\overline{\text{PWM-M}}$ at output terminal $\overline{Q}$.

When master channel inductor current zero-crossing signal ZCD-M is active, master channel control signal PWM-M may be activated to turn on the master channel. When first ramp signal $V_{ramp1}$ reaches feedback signal $V_f$, master channel control signal PWM-M ABT activated to turn off the master channel. First phase shifter 3 can receive master channel control signal PWM-M at its input terminal, and may generate delayed opening signal $PS_1$ by providing a phase shift of about 180° for master channel control signal PWM-M. Second phase shifter 4 can receive inverted control signal $\overline{\text{PWM-M}}$ at its input terminal, and may generate delayed shutdown signal $PS_2$ by providing a phase shift of about 180° for inverted control signal $\overline{\text{PWM-M}}$ at its output terminal.

Slave channel controller 2 can include second RS flip-flop 21 and first AND-gate 22. The first AND-gate 22 can receive delayed opening signal $PS_1$ at its first input terminal, and slave channel inductor current zero-crossing signal ZCD-S at its second input terminal. First AND-gate 22 may generate slave channel opening signal $S_S$, which may be provided to set terminal S of the second RS flip-flop 21 as shown. Second RS flip-flop 21 can receive delayed shutdown signal $PS_2$ at its reset terminal R and slave channel opening signal $S_S$ at its set terminal S, and may generate slave channel control signal PWM-S at its output terminal Q. When slave channel opening signal $S_s$ is active, slave channel control signal PWM-S may be activated to turn on the slave channel. When delayed shutdown signal $PS_2$ is active, slave channel control signal PWM-S may be deactivated to turn off the slave channel.

Figure 4:
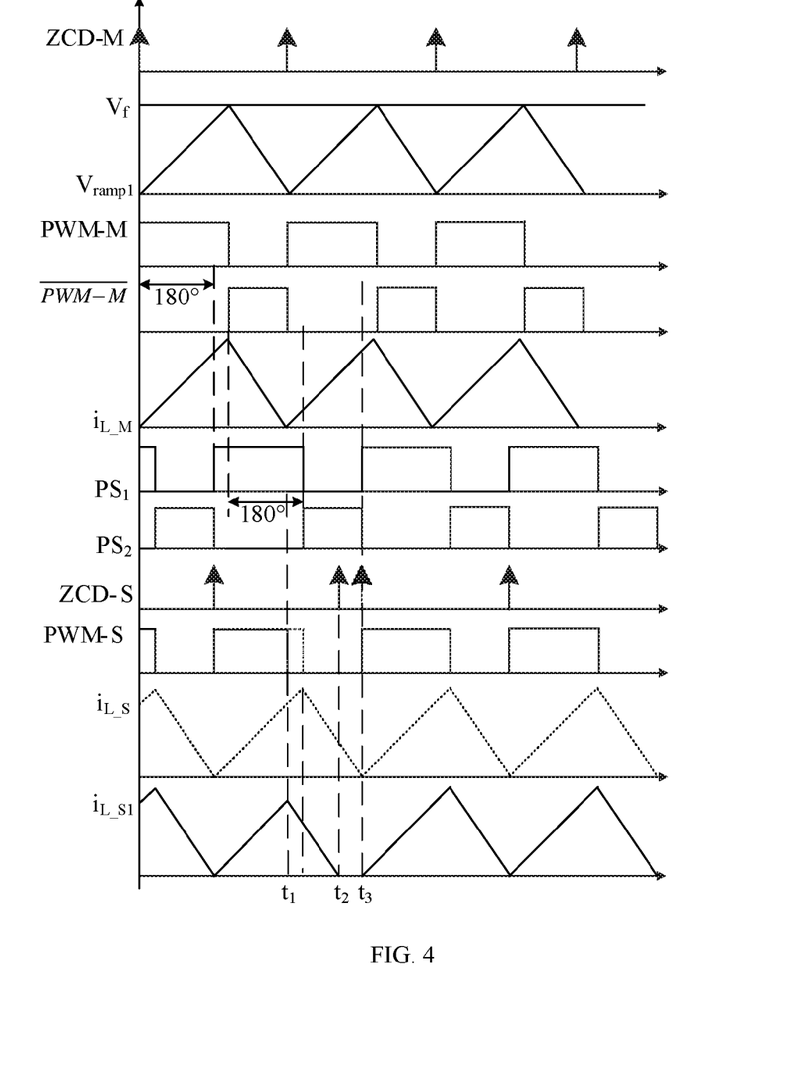
FIG. 4 shows example operation waveforms of the PFC controller of FIG. 3 in a first case.
Figure 5:
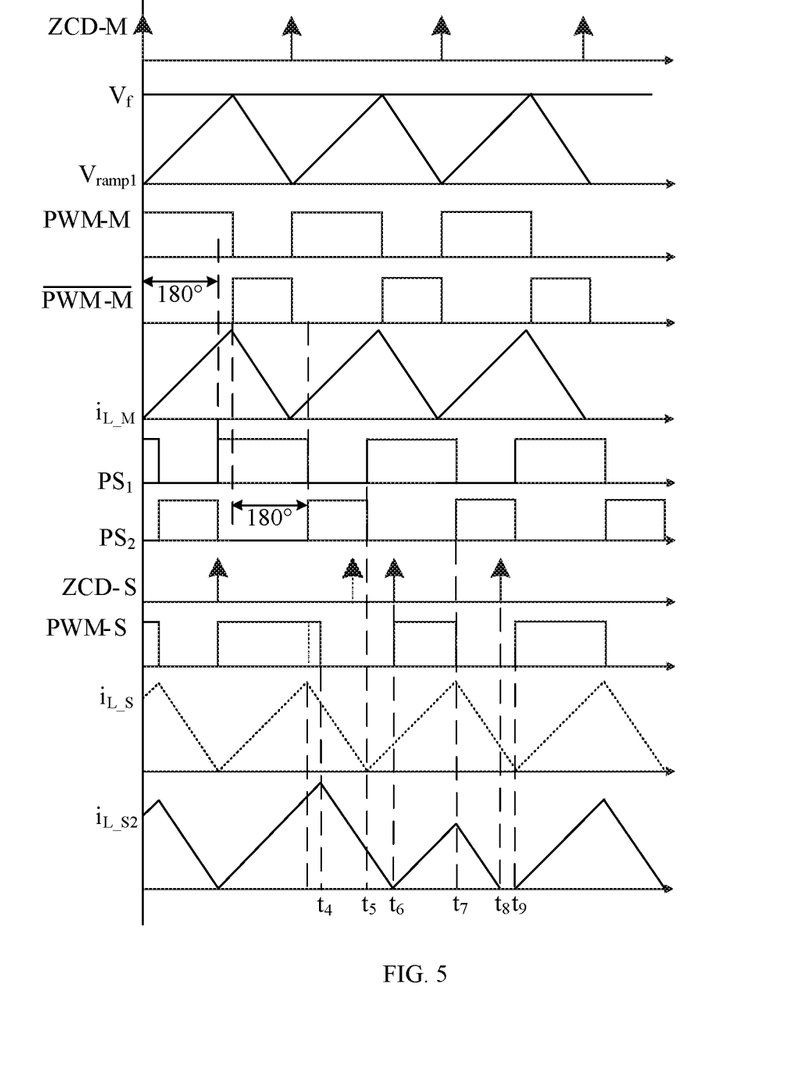
FIG. 5 shows example of operation waveforms of the PFC controller of FIG. 3 in a second case.

Viewed in combination with FIG. 4 and FIG. 5, example operation waveforms of the PFC controller shown in FIG. 3 in two different cases are shown. In these example waveforms, the dotted lines may indicate example waveforms in an ideal state, while the solid lines may indicate example waveforms in practical cases.

With reference to FIG. 4, in the "ideal" state, when master channel inductor current zero-crossing signal ZCD-M is active, master channel control signal PWM-M may be activated while inverted control signal $\overline{\text{PWM-M}}$ may be deactivated. This can lead to an increasing master channel inductor current $i_{L\_M}$. After master channel control signal PWM-M is delayed with a phase shift of about 180°, delayed opening signal $PS_1$ may be activated, and at substantially the same time, slave channel inductor current zero-crossing signal ZCD-S may be activated. Thus, slave channel control signal PWM-S may be activated to turn on the slave channel, and slave channel inductor current $i_{L\_S}$ may start to increase.

When the first ramp signal $V_{ramp1}$ reaches feedback signal $V_f$, master channel control signal PWM-M may be deactivated, while inverted control signal $\overline{\text{PWM-M}}$ is activated. This can lead to a decrease in master channel inductor current $i_{L\_M}$. After inverted control signal $\overline{\text{PWM-M}}$ is delayed with a phase shift of about 180°, delayed shutdown signal $PS_2$ may be activated. Thus, slave channel control signal PWM-S may be deactivated to turn off the slave channel, and slave channel inductor current $i_{L\_S}$ may begin to decrease.

However, in the first case, at time $t_1$, slave channel control signal PWM-S may be deactivated earlier than in the ideal state when affected by interference factors (e.g., noise). This can cause the slave channel to be turned off earlier, and slave channel inductor current $i_{L\_S1}$ may thus have a lower peak value than in the ideal state. At time $t_2$, slave channel inductor current $i_{L\_S1}$ may decrease to zero, which can cause slave channel inductor current zero-crossing signal ZCD-S to be active while delayed opening signal $PS_1$ remains inactive. Due to first AND-gate 22, slave channel control signal PWM-S can also remain inactive.

At time $t_3$, when delayed opening signal $PS_1$ is activated, slave channel control signal PWM-S may be activated to turn on the slave channel. From FIG. 4, during the period from time $t_1$ to time $t_3$, the slave channel may be operating in a DCM state, and the current flowing through the slave inductor may be different from the current flowing through the master inductor. However, the PFC controller may recover to operate in a more ideal BCM state from time $t_3$ on after such an unstable cycle.

With reference to FIG. 5, example operation waveforms of the example PFC controller shown in FIG. 3 in the second case are shown. In the second case, at time $t_4$, slave channel control signal PWM-S may be deactivated later than in an ideal state when affected by interference factors (e.g., noise). This can cause slave channel inductor current $i_{L\_S2}$ to rise to a higher peak value. At time $t_5$, delayed opening signal $PS_1$ may be activated after having been delayed by a phase shift of about 180° while slave channel inductor current zero-crossing signal ZCD-S remains inactive. Due to first AND-gate 22, slave channel control signal PWM-S remains may also remain inactive.

At time $t_6$, when slave channel inductor current $i_{L\_S2}$ reaches zero, slave channel inductor current zero-crossing signal ZCD-S may be activated. Thus, slave channel control signal PWM-S may be activated, and slave channel inductor current $i_{L\_S2}$ may again begin to increase. At time $t_7$, delayed opening signal $PS_1$ may be deactivated, which can cause slave channel control signal PWM-S to be inactive, and slave channel inductor current $i_{L\_S2}$ may begin to decrease. At time $t_8$, when slave channel inductor current $i_{L\_S2}$ reaches zero again, slave channel inductor current zero-crossing signal ZCD-S may be activated. However, slave channel control signal PWM-S may remain inactive as delayed opening signal $PS_1$ remains inactive. From time $t_9$ on, the operation process of the PFC controller may recover to operate in a BCM state. From FIG. 5, during the period from time $t_4$ to time $t_9$, the PFC circuit may not operate in a precise BCM state, however, operation may recover to the more ideal BCM state after, e.g., two unstable cycles.

It can be concluded from the examples FIGS. 3, 4 and 5, due to first AND-gate 22, the slave channel may be turned on only when both of slave channel inductor current zero-crossing signal ZCD-S and delayed opening signal PS1 are active. In this way, the PFC circuit may remain operable in a BCM state in and ideal state, and can be recovered to operate in BCM state quickly even when slave channel control signal PWM-S is affected by interference factors (e.g., noise).

Figure 6:
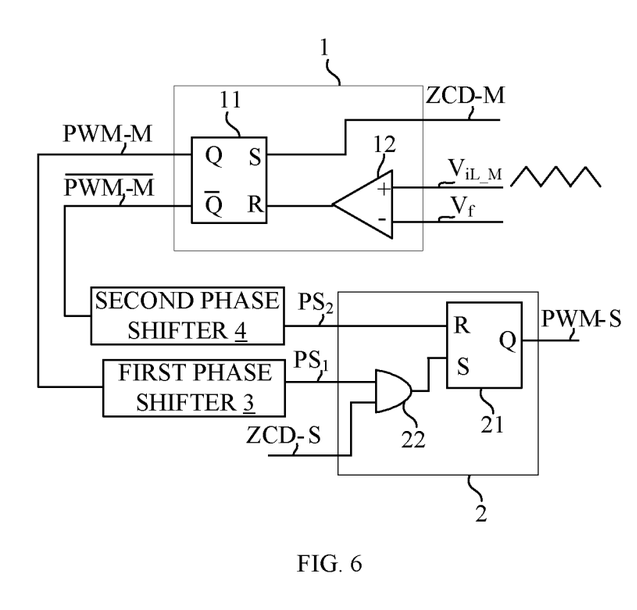
FIG. 6 is a block schematic diagram of an example master-slave interleaved BCM PFC controller operable in a current control mode, in accordance with embodiments of the present invention.

With reference to FIG. 6, shown is a schematic block diagram of an example master-slave interleaved BCM PFC controller in a current control mode, in accordance with embodiments of the present invention. In this example circuit structure of the PFC controller, the first comparator can receive a master channel inductor current sampling signal $V_{iL\_M}$ at its non-inverting terminal.

Figure 7:
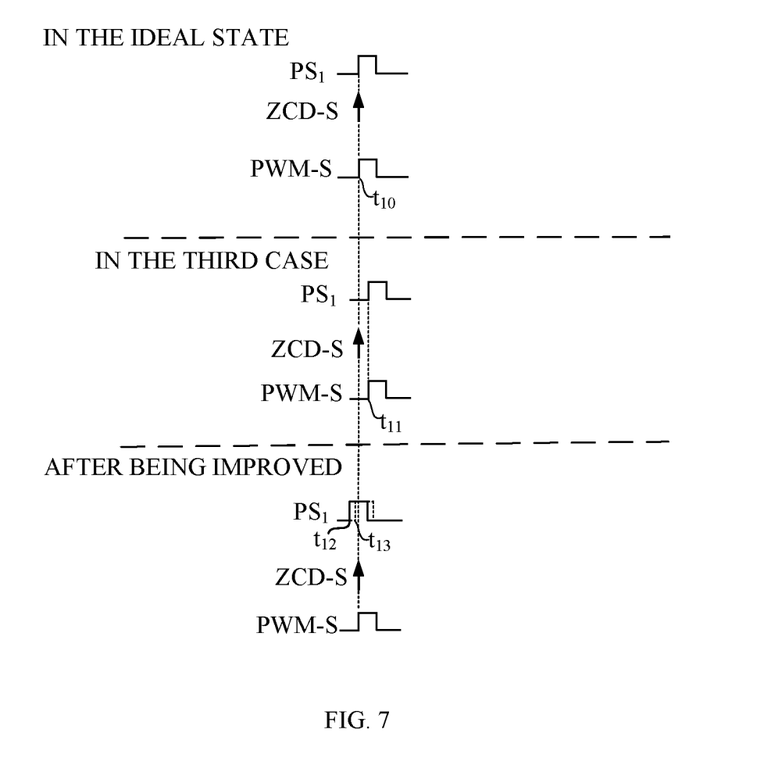
FIG. 7 shows example timing diagrams of the PFC controller of FIG. 3 in an ideal state, in a third case, and after being improved.

With reference to FIG. 7, shown is a third case when the first phase shifter 3 is affected by interference factors (e.g., inaccurate calculations, etc.). Such interference factors may cause first phase shifter 3 to provide a phase shift of more than about 180° for master channel control signal PWM-M. In these example waveforms, timing diagrams of the PFC controller in an ideal state, in the third case, and after being improved are shown.

In the ideal state, at time $t_{10}$, delayed opening signal $PS_1$ may be activated after master channel control signal PWM-M is delayed by 180°. As slave channel inductor current zero-crossing signal ZCD-S is active at substantially the same time, slave channel opening signal PWM-S may be activated to turn on the slave channel. However, in the third case, the first phase shifter 3 may provide a phase shift of more than about 180° for master channel control signal PWM-M when affected by interference factors (e.g., inaccurate calculations). This can delay opening signal $PS_1$ activating at time $t_{11}$ which is later than $t_{10}$ in the ideal state. Slave channel control signal PWM-S may also be activated at time $t_{11}$ even though slave channel inductor current zero-crossing signal ZCD-S has already become active at time $t_{10}$. The slave channel may be turned on later than in the ideal state, and thus the conductive time of the slave channel may be different from the master channel, and current flowing through the slave channel may also be different from current flowing through the master channel.

In order to overcome such a problem, the phase shift for master channel control signal PWM-M may be set to be smaller than about 180°, such as about 170°. In some applications, the phase shift can be set specifically according to the PFC circuit. For example, the phase shift may be user programmable, and may be optimized during testing. With reference to FIG. 7, after being improved, delayed opening signal $PS_1$ may be activated earlier at time $t_{12}$ before slave channel inductor current zero-crossing signal ZCD-S is activated. This may insure that master channel control signal PWM-S is active when slave channel inductor current zero-crossing signal ZCD-S is active. Thus, the slave channel may be turned on when slave channel inductor current reaches zero to make sure that the PFC controller is operating in a BCM state.

Even in the third case, when delayed opening signal $PS_1$ is activated slightly later when affected by interference factors (e.g., inaccurate calculations), delayed opening signal $PS_1$ may still be active at time $t_{13}$, before slave channel inductor current zero-crossing signal ZCD-S is activated, which may also assure the PFC controller is operating in a BCM state. In this way, the example third case issue, such as caused by interference factors (e.g. the inside inaccurate calculation of a phase shifter), can be solved by reducing the phase shift to be smaller than about 180°.

Figure 8:
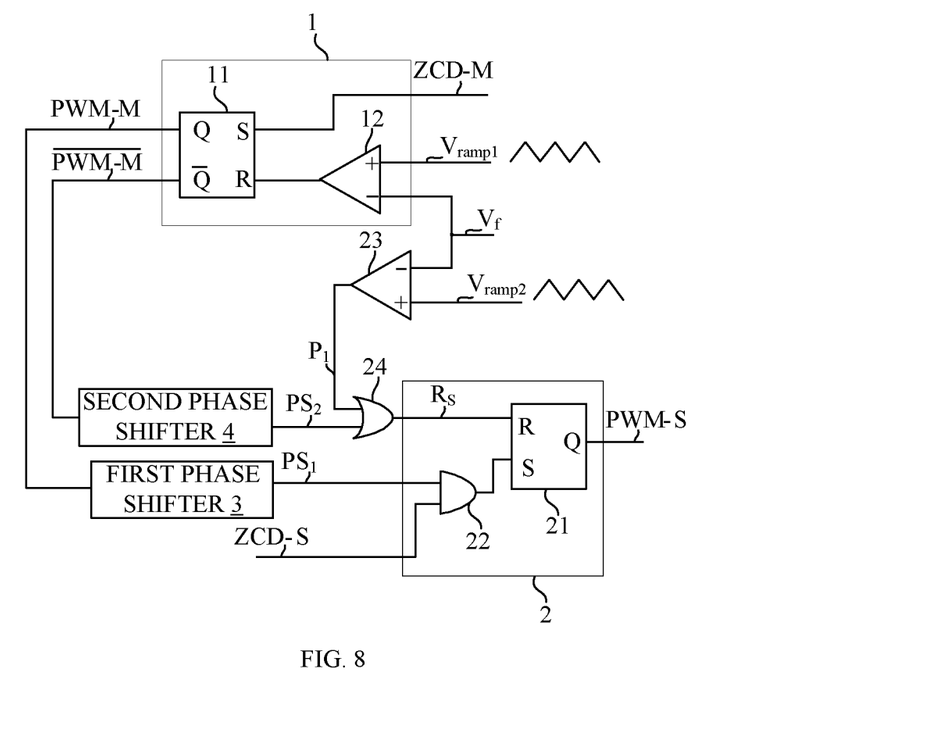
FIG. 8 is a schematic block diagram of a second example master-slave interleaved BCM PFC operable in a voltage control mode, in accordance with embodiments of the present invention.

With reference to FIG. 8, shown is a schematic block diagram of an example master-slave interleaved BCM PFC controller in a voltage control mode in accordance with embodiments of the present invention. In this example, supplemented second comparator 23, and first OR-gate 24, can be included. The inverting terminal of second comparator 23 can receive second ramp signal $V_{ramp2}$ at its non-inverting terminal, and feedback signal $V_f$ at its inverting terminal.

Feedback signal $V_f$ may also be coupled the inverting terminal of first comparator 12, and may generate a first pulse signal $P_1$ at its output terminal, and that may be provided to a first input terminal of first OR-gate 24. First OR-gate 24 can receive first pulse signal $P_1$ at its first input terminal, and delayed shutdown signal $PS_2$ at its second input terminal. First OR-gate 24 can generate a slave channel shutdown signal $R_S$ at its output terminal, which can be coupled with the reset terminal of second RS flip-flop 21. The slave channel may thus be deactivated either when the first pulse signal $P_1$ is active or delayed shutdown signal $PS_2$ is active.

When this example PFC controller operates in current control mode, the circuit structure may be the same or similar to the structure shown in FIG. 8. However, first comparator 12 can receive master channel inductor current sampling signal $i_{L-M}$ at its non-inverting input terminal, and second comparator 23 can receive slave channel inductor current sampling signal $i_{L-S}$ at its non-inverting input terminal. Other differences may also be contemplated in particular embodiments.

Figure 9:
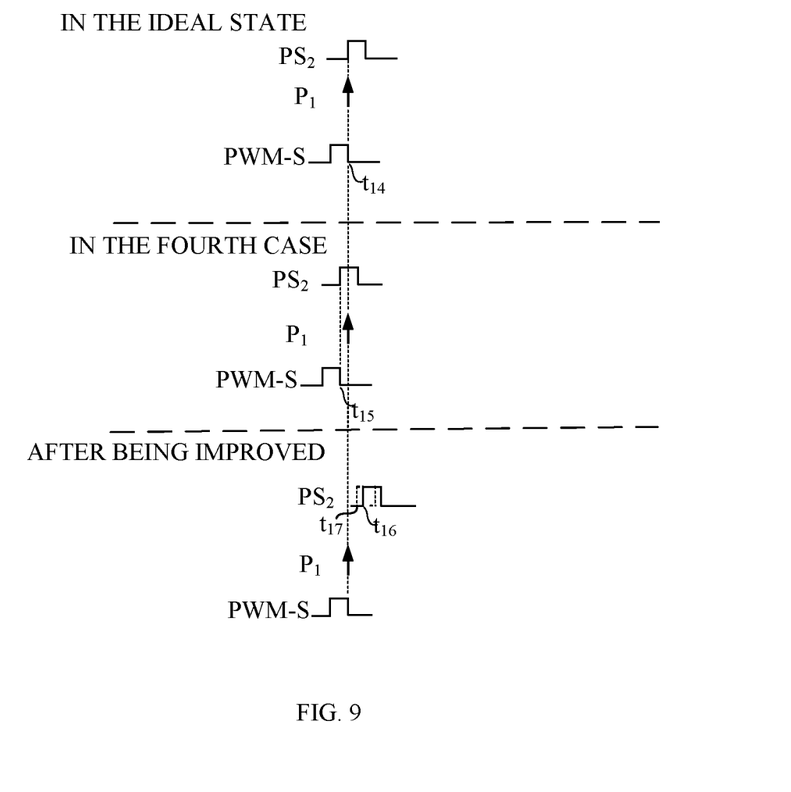
FIG. 9 shows example timing diagrams of the PFC controller of FIG. 8 in an ideal state, in a fourth case, and after being improved.

With reference to FIG. 9, shown is an example fourth case when second phase shifter 4 is affected by interference factors (e.g., inside inaccurate calculations), which may cause second phase shifter 4 to provide a phase shift of less than about 180° for inverted control signal $\overline{PWM\text{-}M}$. In these example waveforms, timing diagrams of the PFC controller in an ideal state, in the fourth case, and after being improved are shown.

In the ideal state, at time $t_{14}$, delayed shutdown signal $PS_2$ may be activated after inverted control signal $\overline{PWM\text{-}M}$ is delayed by about 180°. As the first pulse signal $P_1$ is active at substantially the same time, slave channel control signal PWM-S may be deactivated to turn off the slave channel. However, in the fourth case, second phase shifter 4 may provide a phase shift of less than about 180° for inverted control signal $\overline{PWM\text{-}M}$ when affected by interference factors (e.g., inaccurate calculations). Thus, delayed shutdown signal $PS_2$ may be activated at time $t_{15}$, which is earlier than $t_{14}$ in the ideal state, and slave channel control signal PWM-S may also be deactivated at time $t_{15}$.

Even though first pulse signal $P_1$ may remain inactive at time $t_{15}$, the slave channel may be turned off earlier than in the ideal state, and thus the conductive time of the slave channel may be different from that of the master channel, and current flowing through the slave channel may also be different from current flowing through the master channel. In order to overcome these problems, the phase shift for master channel opening signal PWM-M may be set to be more than about 180°, such as about 190°. In some applications, the phase shift can be set specifically according to the PFC circuit. In some applications, a user may also be able to program (e.g., in a testing flow) this delay.

With reference to FIG. 9, after being improved, delayed shutdown signal $PS_2$ may be activated later at time $t_{16}$ after the first pulse signal $P_1$ turns is activated. This can assure that slave channel control signal PWM-S is inactive when first pulse signal $P_1$ is active. Thus, the second switch may be turned off when the second ramp signal $V_{ramp2}$ reaches feedback signal $V_f$. Even in the fourth circumstance, when delayed shutdown signal $PS_2$ is activated slightly earlier when affected by interference factors (e.g., inaccurate calculations), delayed shutdown signal $PS_2$ may remain active at time $t_{17}$ after the first pulse signal $P_1$ is activated, which may also assure that the PFC controller is operating in a BCM state. In this way, the fourth example case issue that may be caused by interference factors (e.g., the inside inaccurate calculation of phase shifter) can be solved by increasing the phase shift to be more than about 180°.

In a PFC controller, a maximum frequency and a minimum frequency may be set (e.g. programmed) to improve efficiency or to avoid interference factors. In particular embodiments, a maximum frequency and a minimum frequency may be set for the master channel, while the slave channel may be automatically controlled.

Figure 10:
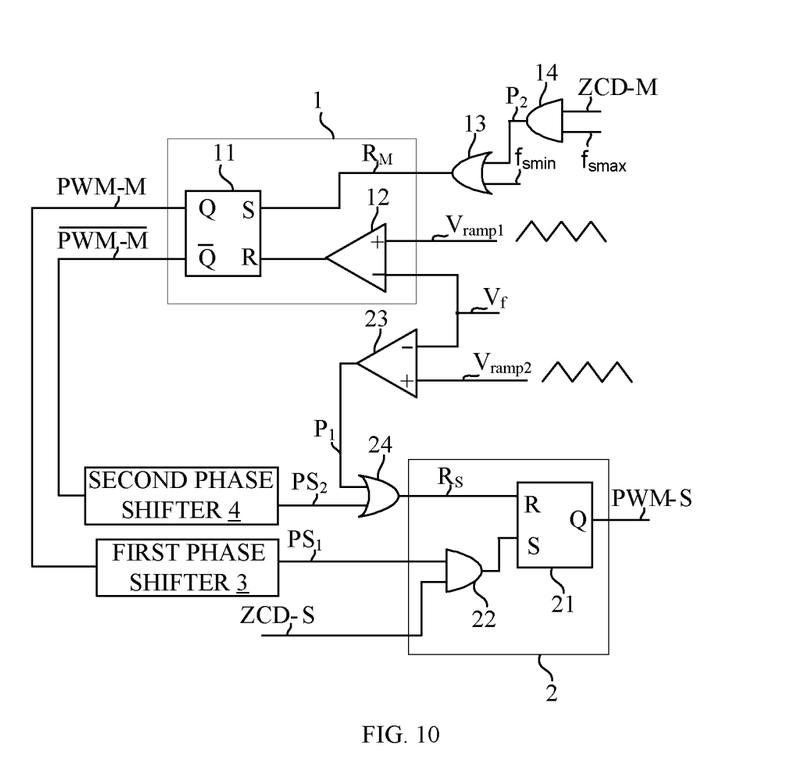
FIG. 10 is a schematic block diagram of an example master-slave interleaved BCM PFC controller with frequency limiting in accordance with embodiments of the present invention.

With reference to FIG. 10, shown is a schematic block diagram of an example master-slave interleaved BCM PFC controller with frequency limiting in accordance with embodiments of the present invention. This example PFC controller can include second OR-gate 13 and second AND-gate 14. Second AND-gate 14 can receive master channel inductor current zero-crossing signal ZCD-M at its first input terminal and a maximum switch frequency limiting signal $f_{smax}$ at its second input terminal. Second AND-gate 14 can generate second pulse signal $P_2$ at its output terminal, which can connect with first input terminal of second OR-gate 13. Second OR-gate 13 can receive second pulse signal $P_2$ at its first input terminal and minimum switching frequency limiting signal $f_{smin}$ at its second input terminal. Second OR-gate 13 can generate a master channel opening signal at its output terminal, which can connect with set terminal S of first RS flip-flop 11.

In the example of FIG. 10, second OR-gate 13 and second AND-gate 14 may be used for generating the master channel opening signal at set terminal S of the first RS flip-flop 11 for turning on the master channel. When the switching frequency of the master channel is lower than the maximum switching frequency, the maximum frequency limiting signal $f_{smax}$ may be activated. If master channel inductor current zero-crossing signal ZCD-M is also active at this time, the master channel may be turned on via second OR-gate 13 and first RS flip-flop 11. When the switching frequency of the master channel is lower than the minimum switching frequency, minimum frequency limiting signal $f_{smin}$ may be activated. Also, the master channel may be turned on via second OR-gate 13 and first RS flip-flop 11.

In this way, the switching frequency of the master channel can be limited between a minimum switching frequency and a maximum switching frequency. With reference to FIG. 10, the switching frequency of the slave channel can be automatically controlled in accordance with the switching frequency of the master channel. As such, the switching frequency of the PFC controller may be limited without setting a maximum frequency limiting signal and a minimum frequency limiting signal for the slave channel. As a result, the anti-jamming performance of PFC controllers in particular embodiments may be improved relative to conventional approaches.

Further, in some applications, a comparison of the different frequencies can be implemented by converting the corresponding frequency signal to a voltage signal. It is also noted that the examples of FIGS. 8 and 10 utilize a voltage control mode as an example to explain in improvement relative to the example of FIG. 3. However, such improvement of particular embodiments can also be applied to current control mode-based controllers. In addition, the power stage of the PFC controller of particular embodiments is not limited to the Boost topology, but rather may be any suitable topology, and the master channel slave channel controllers can be implemented in any suitable fashion.

In one embodiment, a method of operating a master-slave interleaved BCM PFC controller for a PFC circuit, can include: (i) generating a first phase shift for a master channel control signal; (ii) detecting a slave channel inductor current; (iii) activating a slave channel when a master channel opening signal is delayed by the first phase shift and the slave channel inductor current reaches zero; (iv) generating a second phase shift for an inverted master channel control signal; and (v) deactivating the slave channel when the inverted master channel control signal is delayed by the second phase shift.

Figure 11:
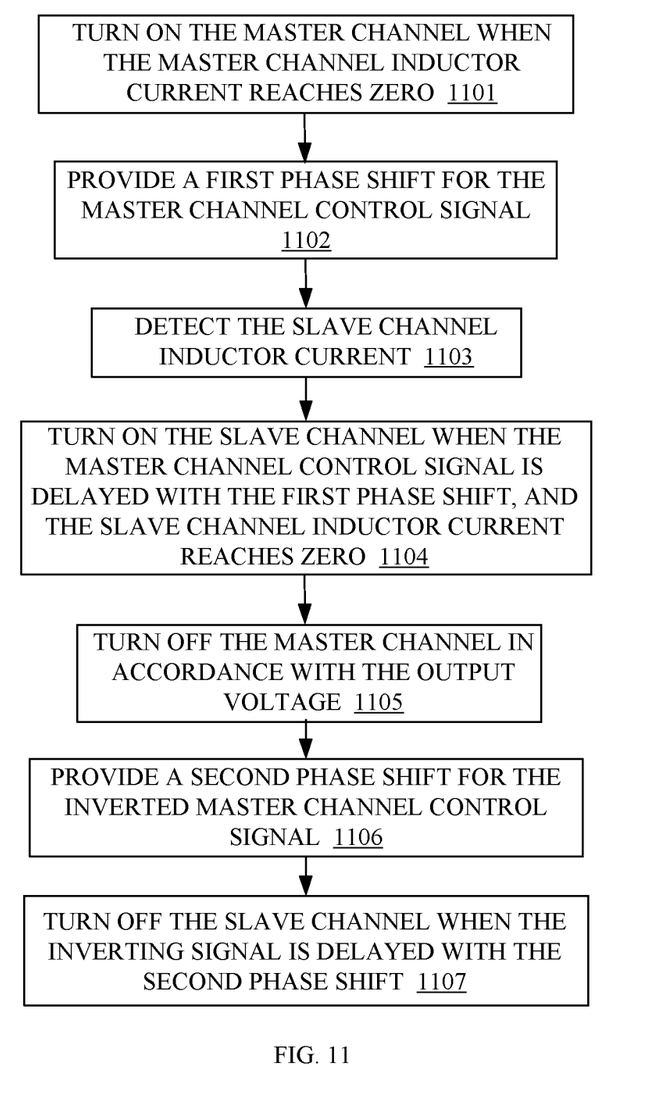
FIG. 11 is a flow diagram of an example control method for a master-slave interleaved BCM PFC controller in accordance with embodiments of the present invention.

With reference to FIG. 11, shown is a flow diagram of an example control method for a master-slave interleaved BCM PFC controller in a voltage control mode, in accordance with embodiments of the present invention. This example method can include, at step 1101, turning on the master channel when the master channel inductor current reaches zero. At step 1102, a first phase shift for the master channel control signal can be provided. At step 1103, the slave channel inductor current can be detected. At step 1104, the slave channel can be turned on when the master channel control signal is delayed with the first phase shift, and the slave channel inductor current reaches zero.

At step 1105, the master channel can be turned off in accordance with the output voltage. At step 1106, a second phase shift can be provided for the inverted master channel control signal. At step 1107, the slave channel can be turned off when the inverted control signal is delayed with the second phase shift. For example, in step 1102, the first phase shift for master channel control signal may be said to about 180°, or less than about 180°. Also, in step 1107, the second phase shift for the inverted master channel control signal may be set to about 180°, or more than about 180°.

Also, in step 1105, the master channel may be turned off when a first ramp signal reaches the feedback signal of the output voltage. Further, the slave channel in step 1107 can be turned off when a second ramp signal reaches the feedback signal of the output voltage. Thus, the second switch may be turned off either when the inverted master channel control signal is delayed with a predetermined phase shift, or when the second ramp signal reaches the feedback signal. When the PFC controller works in a current control mode, the ramp signal can be generated according to the inductor current.

In order to improve improving the anti-jamming performance of the PFC controller, the control method can further include comparing the switching frequency of the master channel against a minimum switching frequency. Also, the switching frequency of the master channel can be compared against the maximum switching frequency. When the switching frequency of the master channel is lower than the minimum switching frequency, the master channel may be turned on. When the switching frequency of the master channel is lower than the maximum switching frequency, and the master channel inductor current reaches zero, the master channel may also be turned on. In this way, the PFC circuit can be substantially maintained as operable in a BCM state in ideal state, and to quickly recover to function in the BCM state when affected by interference factors.

The foregoing descriptions of specific embodiments of the present invention have been presented through images and text for purpose of illustration and description of the voltage controlled current source circuit and method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A master-slave interleaved boundary conduction mode (BCM) power factor correction (PFC) controller for controlling a PFC circuit with master and slave channels, said PFC controller comprising:
   a) a master channel controller configured to generate a master channel control signal and an inverted master channel control signal;
   b) a first phase shifter configured to provide a first phase shift for said master channel control signal, and to generate a delayed opening signal therefrom;
   c) a second phase shifter configured to provide a second phase shift for said inverted master channel control signal, and to generate a delayed shutdown signal therefrom;
   d) a slave channel controller configured to receive said delayed opening signal, said delayed shutdown signal, and a slave channel inductor current zero-crossing signal, and to generate a slave channel control signal therefrom, wherein said slave channel control signal and said slave channel are configured to be activated when said delayed opening signal and said slave channel inductor current zero-crossing signal are both active, and to be deactivated when said delayed shutdown signal is active;
   e) said slave channel controller comprising: a first RS flip-flop configured to receive said delayed shutdown signal at a reset terminal, and to generate a slave channel control signal for said slave channel; a first AND-gate configured to receive said delayed opening signal and said slave channel inductor current zero-crossing final, and to generate a slave channel opening signal therefrom, wherein said slave channel opening signal is coupled to a set terminal of said first RS flip-flop; and
   f) said slave channel controller further comprising: a first comparator configured to generate a first pulse signal: a first OR-gate configured to receive said first pulse signal and said delayed opening signal, and to generate a slave channel shutdown signal, wherein said slave channel shutdown signal is coupled to said reset terminal of said first RS flip-flop, wherein said slave channel is configured to be deactivated when at least one of said first pulse signal and said delayed opening signal is active.

2. The PFC controller of claim 1, wherein said master channel controller comprises:
   a) a second RS flip-flop configured to receive a master channel inductor current zero-crossing signal at a set terminal, and to generate said master channel control signal and said inverted master channel control signal; and
   b) a second comparator configured to generate a master channel shutdown signal, wherein said master channel shutdown signal is coupled to a reset terminal of said second RS flip-flop.

3. The PFC controller of claim 2, wherein when said PFC controller operates in a voltage control mode, said second comparator is configured to receive a first ramp signal and a feedback signal of an output voltage of said PFC circuit.

4. The PFC controller of claim 2, wherein when said PFC controller operates in a current control mode, said second comparator is configured to receive a master channel inductor current sampling signal and a feedback signal of an output voltage of said PFC circuit.

5. The PFC controller of claim 2, further comprising:
   a) a second AND-gate configured to receive said master channel inductor current zero-crossing signal and a maximum frequency limiting signal, and to generate a second pulse signal therefrom; and
   b) a second OR-gate configured to receive a minimum frequency limiting signal and said second pulse signal, and to generate a master channel opening signal, wherein said master channel opening signal is coupled to said set terminal of said second RS flip-flop;
   c) wherein said maximum frequency limiting signal is configured to be active when a switching frequency of said master channel is lower than a predetermined maximum switching frequency;
   d) wherein said minimum frequency limiting signal is configured to be active when said switching frequency of said master channel is lower than a predetermined minimum switching frequency; and
   e) wherein said master channel is configured to be activated when at least one of said second pulse signal and said minimum frequency limiting signal is active.

6. The PFC controller of claim 1, wherein when said PFC controller operates in a voltage control mode, said first comparator is configured to receive a second ramp signal and a feedback signal of an output voltage of said PFC circuit.

7. The PFC controller of claim 1, when said PFC controller operates in a current control mode, said first comparator is configured to receive a slave channel inductor current sampling signal and a feedback signal of an output voltage of said PFC circuit.

8. The PFC controller of claim 1, wherein:
   a) said first phase shift is less than or equal to 180°; and
   b) said second phase shift is at least 180°.

9. A method of operating a master-slave interleaved boundary conduction mode (BCM) power factor correction (PFC) controller for a PFC circuit, the method comprising:
   a) generating a first phase shift for a master channel control signal;
   b) detecting a slave channel inductor current;
   c) activating, by a slave channel controller, a slave channel when a master channel opening signal is delayed by said first phase shift and said slave channel inductor current reaches zero;
   d) generating a second phase shift for an inverted master channel control signal;
   e) deactivating, by said slave channel controller, said slave channel when said inverted master channel control signal is delayed by said second phase shift;
   f) said slave channel controller comprising: a first RS flip-flop receiving a delayed shutdown signal at a reset terminal, and generating a slave channel control signal for said slave channel; a first AND-gate receiving a delayed opening signal and a slave channel inductor current zero-crossing signal, and generating a slave channel opening signal therefrom, wherein said slave channel opening signal is coupled to a set terminal of said first RS flip-flop; and
   g) said slave channel controller further comprising: a first comparator generating a first pulse signal; a first OR-gate receiving said first pulse signal and said delayed opening signal, and generating a slave channel shutdown signal, wherein said slave channel shutdown signal is coupled to said reset terminal of said first RS flip-flop, and wherein said slave channel is deactivated when at least one of said first pulse signal and said delayed opening signal is active.

10. The method of claim 9, wherein when said PFC circuit operates in a voltage control mode, said method further comprises:
   a) detecting a master channel inductor current;
   b) activating a master channel when said master channel inductor current reaches zero;

c) comparing a first ramp signal with a feedback signal; and
d) deactivating said master channel when said first ramp signal reaches said feedback signal.

11. The method of claim 10, further comprising:
a) comparing a switching frequency of said master channel with a predetermined minimum switching frequency;
b) comparing said switching frequency of said master channel with a predetermined maximum switching frequency;
c) activating said master channel when said switching frequency of said master channel is lower than said predetermined maximum switching frequency and said master channel inductor current zero-crossing signal reaches zero; and
d) activating said master channel when said switching frequency of said master channel is lower than said predetermined minimum switching frequency.

12. The method of claim 10, further comprising:
a) comparing a second ramp signal with said feedback signal; and
b) deactivating said slave channel when said second ramp signal reaches said feedback signal.

13. The method of claim 12, further comprising:
a) comparing said slave channel inductor current with said feedback signal; and
b) deactivating said slave channel when said slave channel inductor current reaches said feedback signal.

14. The method of claim 9, wherein when said PFC circuit operates in a current control mode, said method further comprises:
a) detecting a master channel inductor current;
b) activating a master channel when said master channel inductor current reaches zero;
c) comparing said master channel inductor current with a feedback signal; and
d) deactivating said master channel when said master channel inductor current reaches said feedback signal.

15. The method of claim 14, further comprising:
a) comparing a switching frequency of said master channel with a predetermined minimum switching frequency;
b) comparing said switching frequency of said master channel with a predetermined maximum switching frequency;
c) activating said master channel when said switching frequency of said master channel is lower than said predetermined maximum switching frequency and said master channel inductor current zero-crossing signal reaches zero; and
d) activating said master channel when said switching frequency of said master channel is lower than said predetermined minimum switching frequency.

16. The method of claim 9, wherein:
a) said first phase shift is less than or equal to 180°; and
b) said second phase shift is at least 180°.

* * * * *